US010930039B2

(12) United States Patent
Lin et al.

(10) Patent No.: US 10,930,039 B2
(45) Date of Patent: Feb. 23, 2021

(54) SYSTEMS AND METHODS FOR PERSONALIZED BANNER GENERATION AND DISPLAY

(71) Applicant: Oath Inc., New York, NY (US)

(72) Inventors: Wan-Ting Lin, Taipei (TW); Man-Ju Chou, Taichung (TW); Li-Yu Chen, New Taipei (TW); Chih-Kuei Weng, Taipei (TW)

(73) Assignee: Verizon Media Inc., New York, NY (US)

( * ) Notice: Subject to any disclaimer, the term of this patent is extended or adjusted under 35 U.S.C. 154(b) by 87 days.

(21) Appl. No.: 16/260,203

(22) Filed: Jan. 29, 2019

(65) Prior Publication Data

US 2020/0242824 A1  Jul. 30, 2020

(51) Int. Cl.
*G06T 11/60* (2006.01)
*G06T 7/194* (2017.01)
*G06F 16/538* (2019.01)
*G06F 16/53* (2019.01)
*G06Q 30/02* (2012.01)
*G06F 16/535* (2019.01)

(52) U.S. Cl.
CPC ............ *G06T 11/60* (2013.01); *G06F 16/535* (2019.01); *G06F 16/538* (2019.01); *G06Q 30/0271* (2013.01); *G06T 7/194* (2017.01)

(58) Field of Classification Search
None
See application file for complete search history.

(56) References Cited

U.S. PATENT DOCUMENTS

| | | | | |
|---|---|---|---|---|
| 2008/0246777 | A1* | 10/2008 | Swanson | H04N 5/2256 345/640 |
| 2012/0011454 | A1* | 1/2012 | Droz | G06Q 30/0251 715/758 |
| 2015/0006299 | A1* | 1/2015 | Efrati | G06Q 30/0269 705/14.67 |
| 2015/0256899 | A1* | 9/2015 | Chand | H04N 21/812 725/34 |
| 2017/0103430 | A1* | 4/2017 | Gilbert | G06Q 30/0277 |
| 2018/0137540 | A1* | 5/2018 | Nightingale | G06Q 30/0251 |
| 2019/0073697 | A1* | 3/2019 | Varley | G06Q 30/0275 |
| 2020/0258236 | A1* | 8/2020 | Lin | G06K 9/00268 |

* cited by examiner

*Primary Examiner* — Justin P. Misleh
(74) *Attorney, Agent, or Firm* — Cooper Legal Group, LLC

(57) ABSTRACT

One or more computing devices, systems, and/or methods for personalized banner generation and display is provided. For example, an image comprising a product object depicting a product is identified. A background of the image is identified and removed. Features of the product object are evaluated to determine a product type of the product. A new background is selected based upon the product type. A banner comprising the new background and the product object positioned over the new background at a position within the banner is generated. The banner is rendered on a display of a computing device through a user interface.

20 Claims, 10 Drawing Sheets

SYSTEMS AND METHODS FOR PERSONALIZED BANNER GENERATION AND DISPLAY

BACKGROUND

Many users access content through computing devices, such as smart watches, mobile phones, computers, and/or a variety of other electronic devices. A user may access content that is displayed through a user interface, such as a web browser displaying a website or an application displaying application content. While a user accesses content through the user interface, it may be efficient to show additional relevant and/or interesting content to the user through the user interface. For example, information about a product that may be interesting to the user may be displayed through a banner populated within the user interface. Because there may be millions of different products and interests of each user, manual generation of individual banners for every situation, product, and user is not feasible, and would consume a large amount of computing resources and human manual effort to create and store the banners.

SUMMARY

In accordance with the present disclosure, one or more computing devices and/or methods for personalized banner generation and display are provided. In an embodiment, a determination is made that a user is accessing content through a user interface displayed on a computing device. Information about the user, such as browsing history, purchase history, location, profile information, age, gender, social network data, AD interactive data, mail content, calendar data, etc. is used to determine that the user has an interest. An image relating to the interest may be obtained. The image is processed, such as by an unsupervised image segmentation process to remove a background of the image and identify a product object, within the image, depicting a product. Other content, such as logos, text, or other objects are also removed from the product as part of removing the background. In this way, the product object is isolated for further processing.

Features of the product object are evaluated to determine a product type of the product. For example, an image recognition net (e.g., an image recognition net VGC-19) processes features of the product object (e.g., shape, color, and/or other product identifying features extractable from the image) to select the product type of the product from a list of product types. A new background is selected based upon the product type or a theme which is manually assigned. Supplemental content (e.g., a price of the product, a product description, etc.) and/or decorator objects (e.g., overlay imagery, such as a sun object, a cloud object, a tree object, etc. that may be overlaid the new background) may be acquired based upon the product type. In this way, a banner is generated to comprise the new background. The product object, the supplemental content, and/or the decorator objects are inserted into the banner at select locations.

A visual adjustment is applied to the banner, such as to modify a brightness, a saturation, a size, a position, a color, and/or other visual properties of the new background, the product object, the decorator objects, and/or the supplemental content. The banner is machine generated by a computer in a manner that is aesthetic and personalized to the user. In this way, the banner is rendered through the user interface on the display of the computing device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
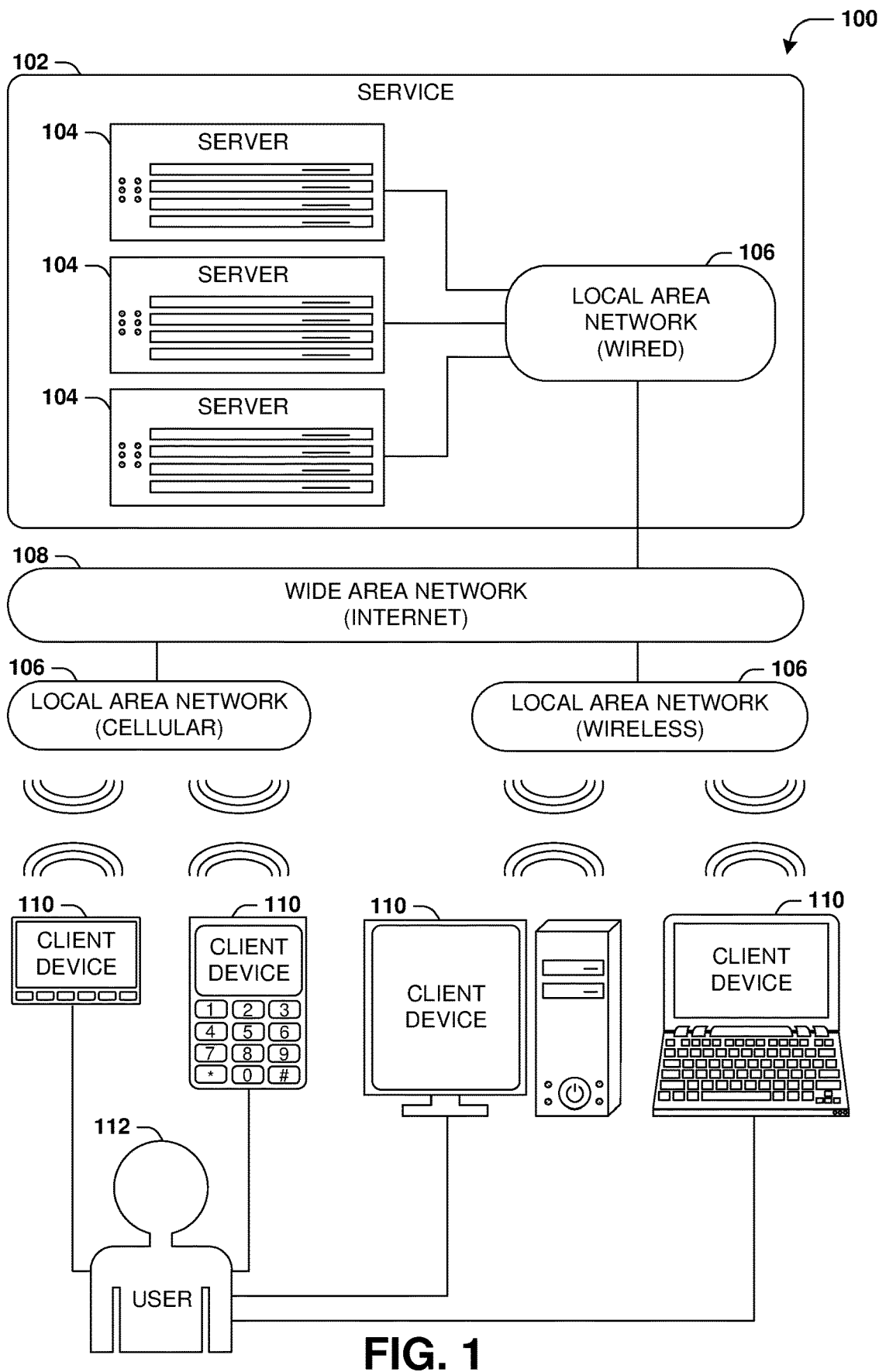
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
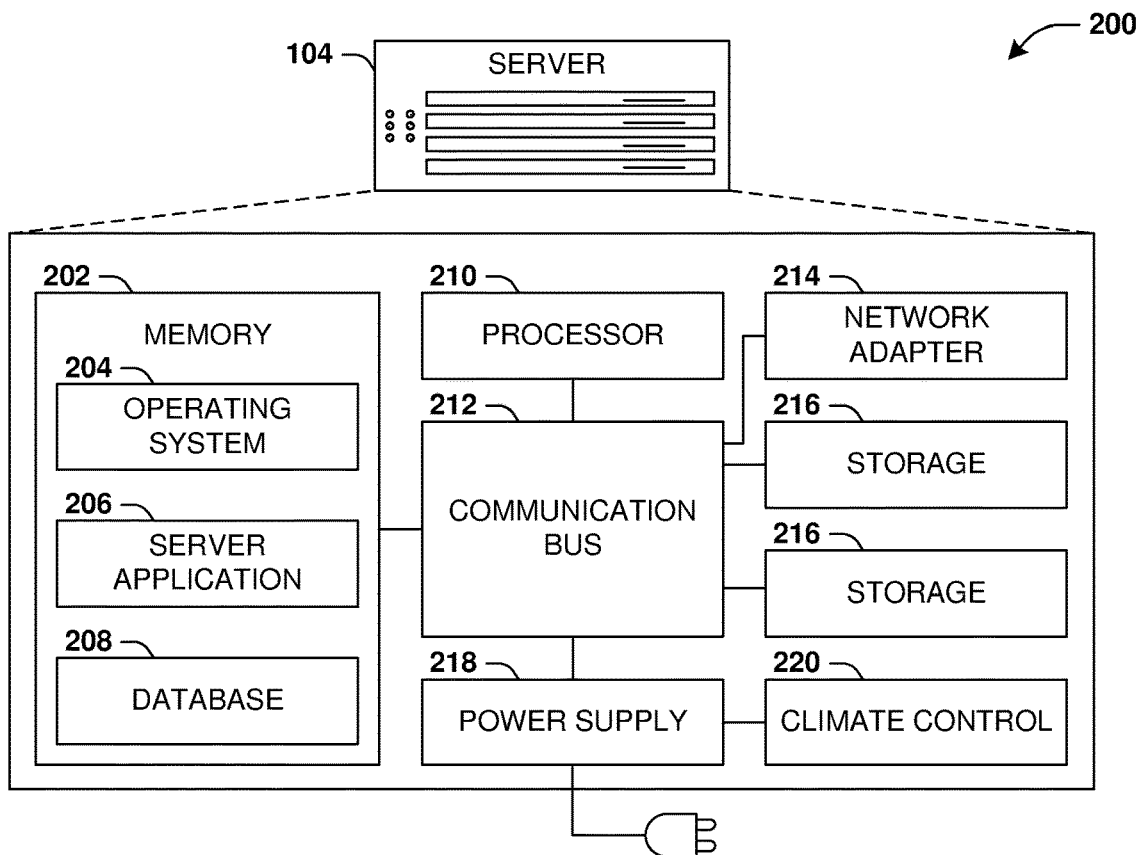
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
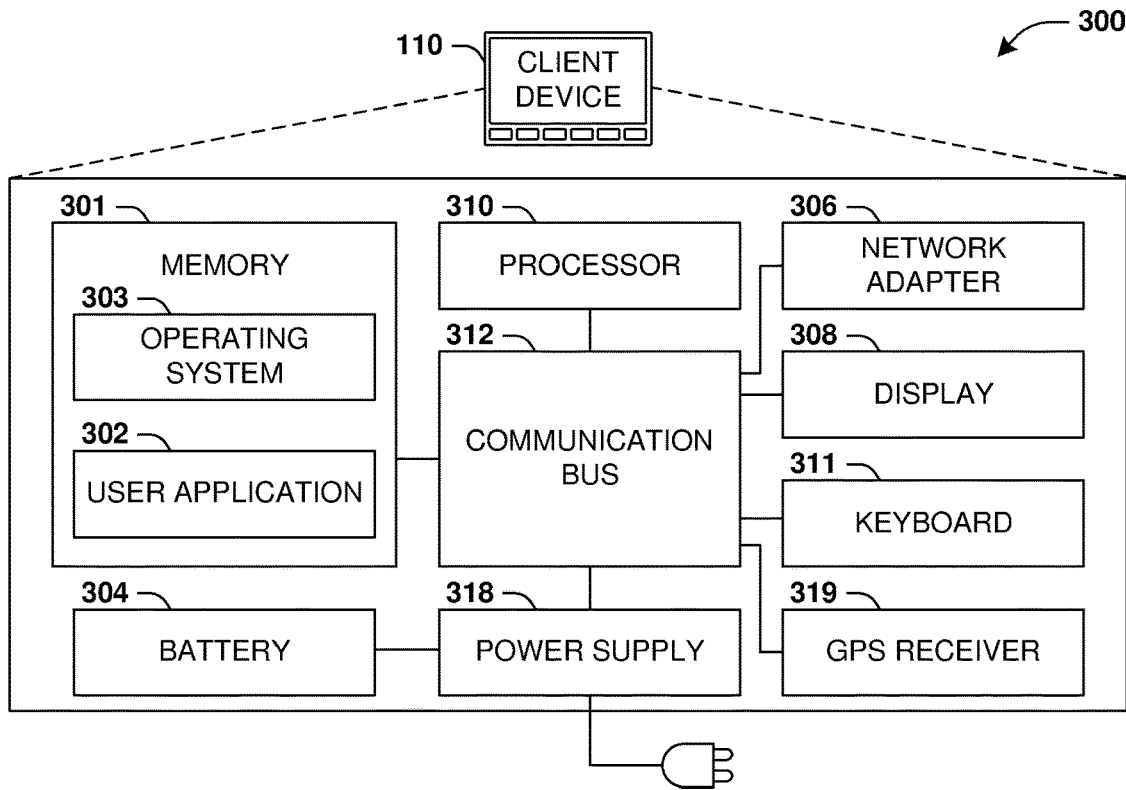
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for personalized banner generation and display are provided. In particular, the present system provides for machine banner design by a computer that can automatically design and generate personalized banners (e.g., on the fly in response to a user accessing a user interface through which the banner will be displayed) with human aesthetic using machine intelligence. Personalized banners provide an improved user experience because users will be more likely to interact with banners personalized to the interests and design tastes of the users. Otherwise, it is too manually and computer resource intensive for humans to use computers to generate millions of banners personalized for every possible situation that may occur, such as due to millions of different products and users with different tastes and interests, product information such as price or quantity that quickly change, etc.

As will be further discussed, the present system is configured to automatically generate personalized banners by performing background removal of an image depicting a product, identifying suitable new background candidates and decorators, arranging and constructing a banner based upon a product type of the product, and applying color schemes to the banner. The present system is configured to generate personalized banners in real-time when users access user interfaces, such as browsing to a website. The present system is configured to automatically gather mass layer data for the purpose of machine learning training for how to design and generate banners. The present system is configured to construct an ecosystem (repository) of personalized banners, such that user feedback (e.g., interaction with a banner or a user ignoring a banner) is used to train and modify a recommendation module used to design and generate banners.

The present system is configured to auto-resize and/or auto-crop personalized banners based upon user browsing behaviors and/or attributes of a device (e.g., a screen size, a view orientation, a resolution, etc.). The present system is configured to automatically generate and personalize banners for content campaign execution when needed (e.g., each action performed for generating and personalizing banners can be turned on or off as required). The present system is configured to generate banner layouts based on user scenarios, such as where different banner layouts are used based upon location within a user interface at which a banner is to be displayed. The present system is configured to generate banner layouts based on user feedback, such as where different banner layouts are used for different users based upon user reactions to banners in the past.

The present system is configured to perform background removal by detecting a main item (e.g., a product object) within an image so as to define background areas to be removed from the image. Areas in the image are segmented based upon saturation and brightness. Background areas are removed based upon item detection and the segmented areas, while an area comprising the main item is retained for further processing.

The present system is configured to apply a color scheme to a banner. In particular, items, backgrounds, decorators, text, and/or other elements (objects) are separated and colored based upon different hues on a color wheel. The present system is configured to determine a location at which the main item (e.g., the product object) is to be positioned in the banner based upon a geometric center of the item in an aesthetic manner. The present system is configured to distribute elements on the banner in an aesthetic manner. The present system is configured to create and review banners through user feedback to enhance aesthetics of banner generation using machine learning to process the user feedback.

Figure 4:
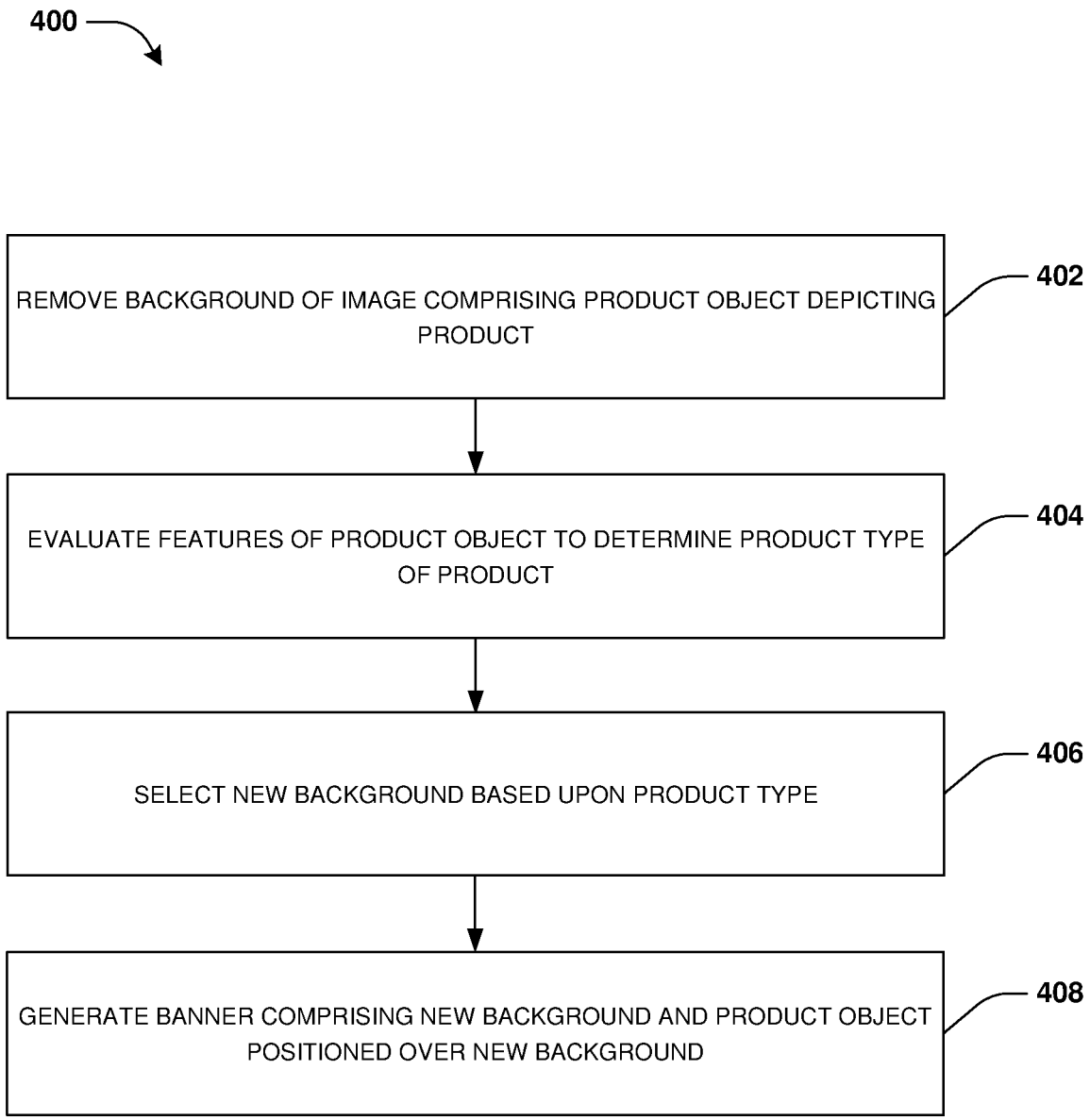
FIG. 4 is a flow chart illustrating an example method for personalized banner generation and display.
Figure 5A:
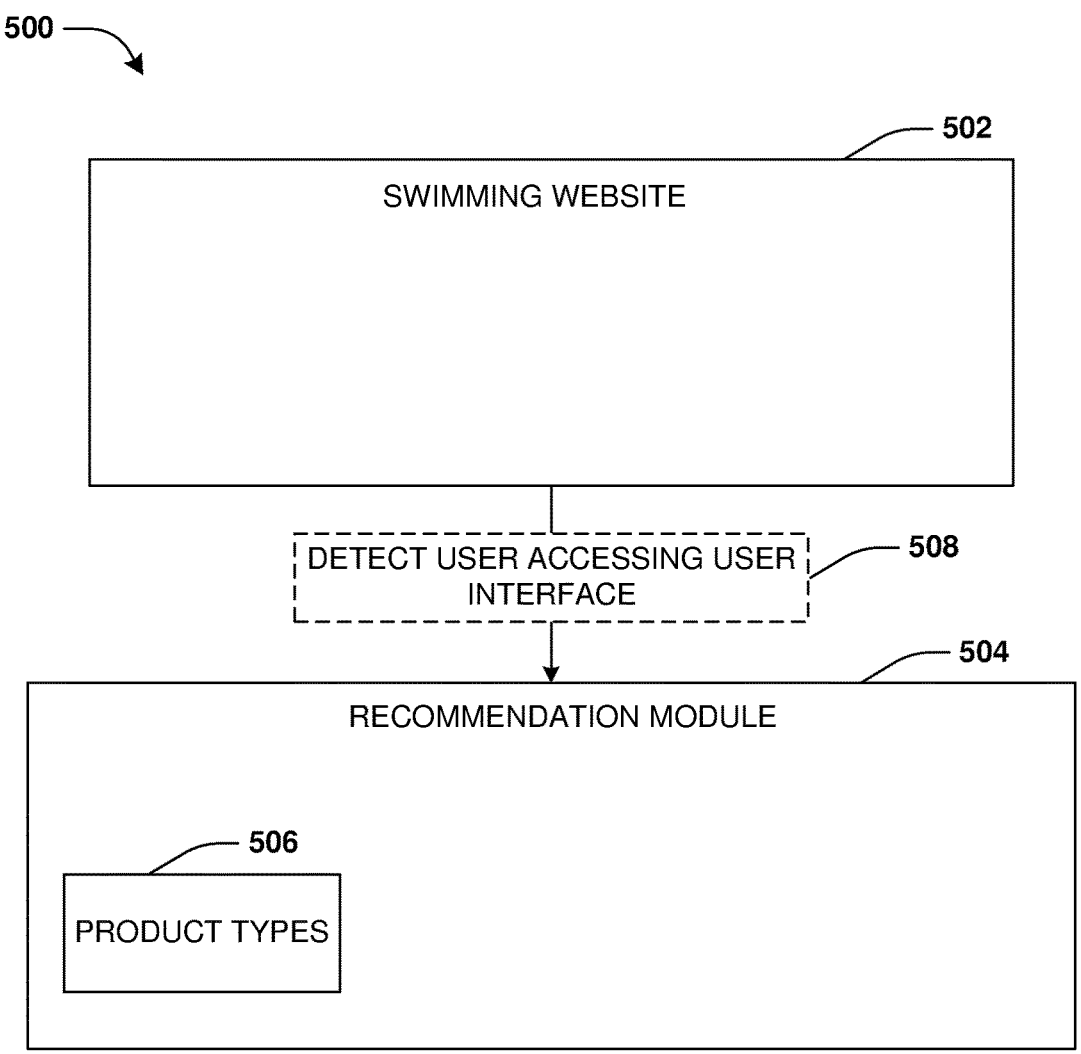
FIG. 5A is a component block diagram illustrating an example system for personalized banner generation and display, where a user accesses a user interface.

An embodiment of personalized banner generation and display is illustrated by an example method 400 of FIG. 4, which is described in conjunction with FIGS. 5A-5F. In an example, a user may use a computing device, such as a mobile device, a computer, a wearable device, a smart watch, etc., to access a user interface populated with content of a swimming team website, as illustrated by FIG. 5A. In an embodiment, a recommendation module 504 (e.g., hardware and/or software executing one or more computers for designing, generating, and displaying/rendering personalized banners) may detect 508 the user accessing the user interface. In an embodiment, an identity of the user is identified, if possible, so that user information can be obtained and evaluated to determine interests of the user (e.g., a browsing history of visiting music websites, a social network post about wanting recommendations for a guitar to purchase, an email from a music store, a calendar entry about band practice, user profile information such as age and gender, etc.). For example, the user information may indicate that the user has an interest in guitars.

Figure 5B:
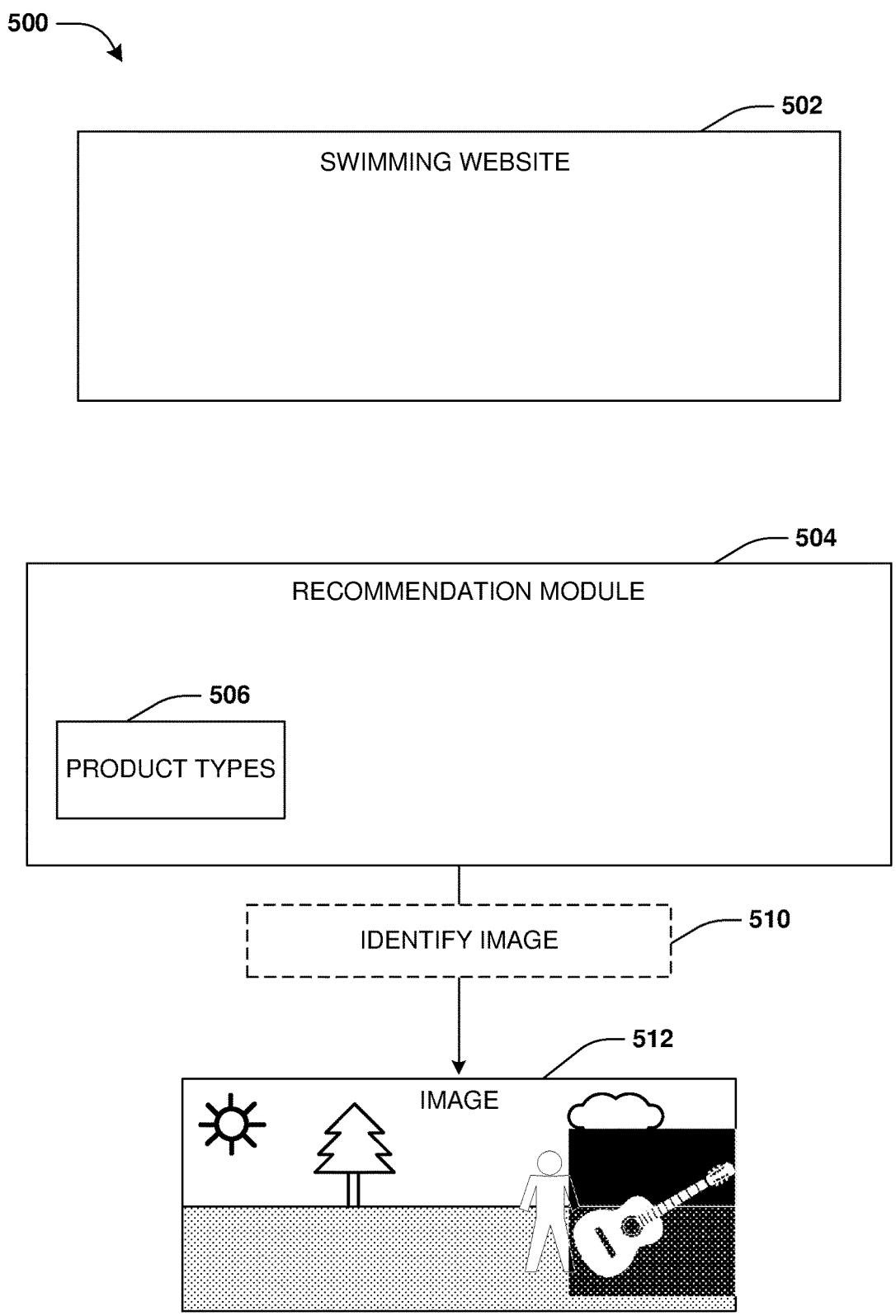
FIG. 5B is a component block diagram illustrating an example system for personalized banner generation and display, where an image is identified.

The recommendation module 504 is configured to identify 510 an image 512 depicting a product, as illustrated in FIG. 5B. For example, the recommendation module 504 identifies 510 the image 512 based upon the image 512 depicting a guitar and the user having the interest in guitars. The image 512 may be identified from an image repository of images depicting products or identified from any other content source. In this way, images are identified based upon the images relating to interests of users.

The image 512 is processed in order to generate a personalized banner that the particular user will likely find to be aesthetic and comprising relevant content, thus increasing a likelihood that the user will want to interact with the banner.

Figure 5C:
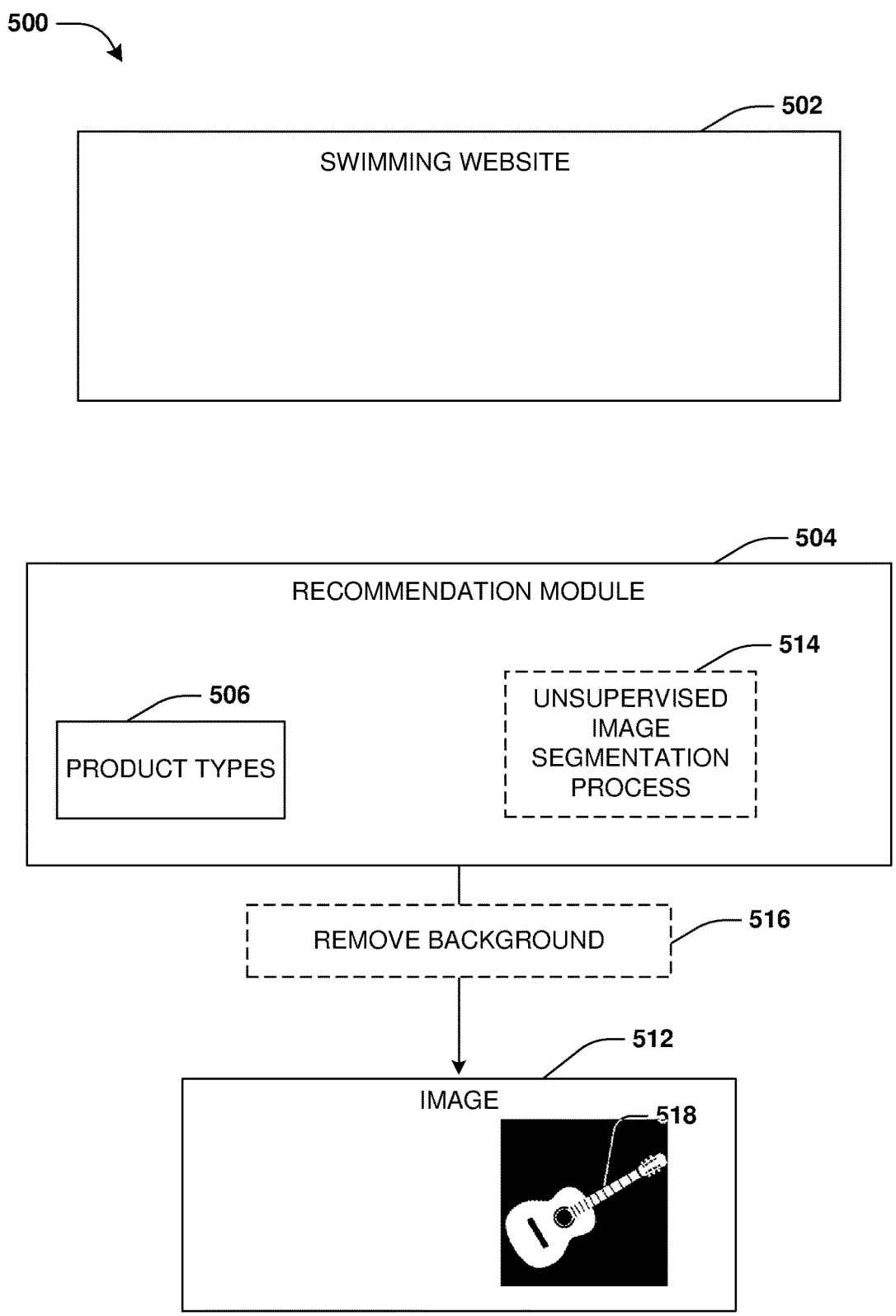
FIG. 5C is a component block diagram illustrating an example system for personalized banner generation and display, where a background of an image is removed.

At 402, a background of the image 512 is removed 516, as illustrated by FIG. 5C. In an embodiment, an unsupervised image segmentation process 514 is executed by the recommendation module 504 to distinguish a first portion of the image 512 as depicting the product, such as a guitar product object 518 depicted within the image 512, from a second portion of the image 512 depicting the background (e.g., a sun object, a tree object, a sky object, a grass object, a cloud object, and/or other objects other than the guitar product object 518). In particular, the unsupervised image segmentation process 514 performs edge detection to detect edges of objects depicted within the image 512, such as the cloud object, the guitar product object 518, the sun object, etc. The unsupervised image segmentation process 514 calculates areas of each object, such as a pixel count of pixels representing each object. In some examples, images for a product may depict the product at a size that is larger than other objects depicted within the images, the guitar product object 518 is identified as depicting a product based upon the guitar product object 518 having an area larger than areas of other objects depicted within the image 512, for example. It may be appreciated that a variety of other techniques may be used to detect areas of an image as depicting a product (e.g., a machine learning model may be used for image recognition such as feature extraction and entity recognition). In an embodiment, multiple product objects may be identified if there is a set of objects having a relatively larger area than other objects (e.g., an image depicts multiple products).

The objects other than the guitar product object 518 are removed from the image 512, such as removal of the sun object, the cloud object, the grass object, the tree object, etc. as part of removing 516 the background. An object may be removed by assigning an average color of surrounding pixels to pixels of the removed object.

Figure 5D:
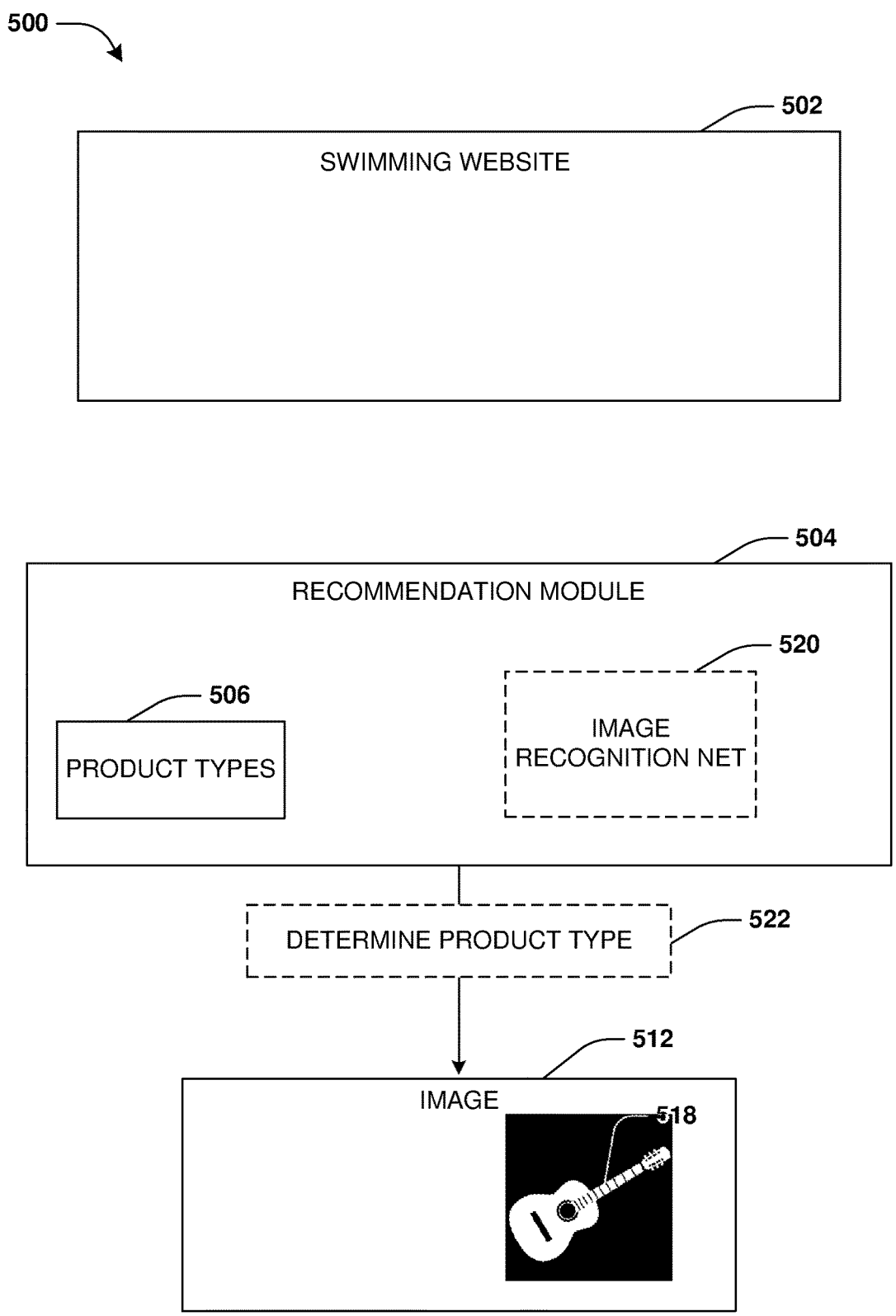
FIG. 5D is a component block diagram illustrating an example system for personalized banner generation and display, where a product type of a product depicted by a product object is determined.

At 404, features of the guitar product object 518 are evaluated to determine 522 a product type of the product, as illustrated by FIG. 5D. In particular, the recommendation module 504 maintains a product type list 506 of various product types and/or features indicative of such product types (e.g., punk, high tech, sweet pink, or any other type of product). The features may correspond to shape, size, color, and/or a wide variety of other features that can be extracted from images for detecting a product type of a product. In an example, an image recognition net 520 (e.g., image recognition net VGC-19) or other machine learning technique is used to process the features extracted from the image 512 to identify a corresponding product type from the product type list 506 for the guitar product object 518, such as a music product type.

Figure 5E:
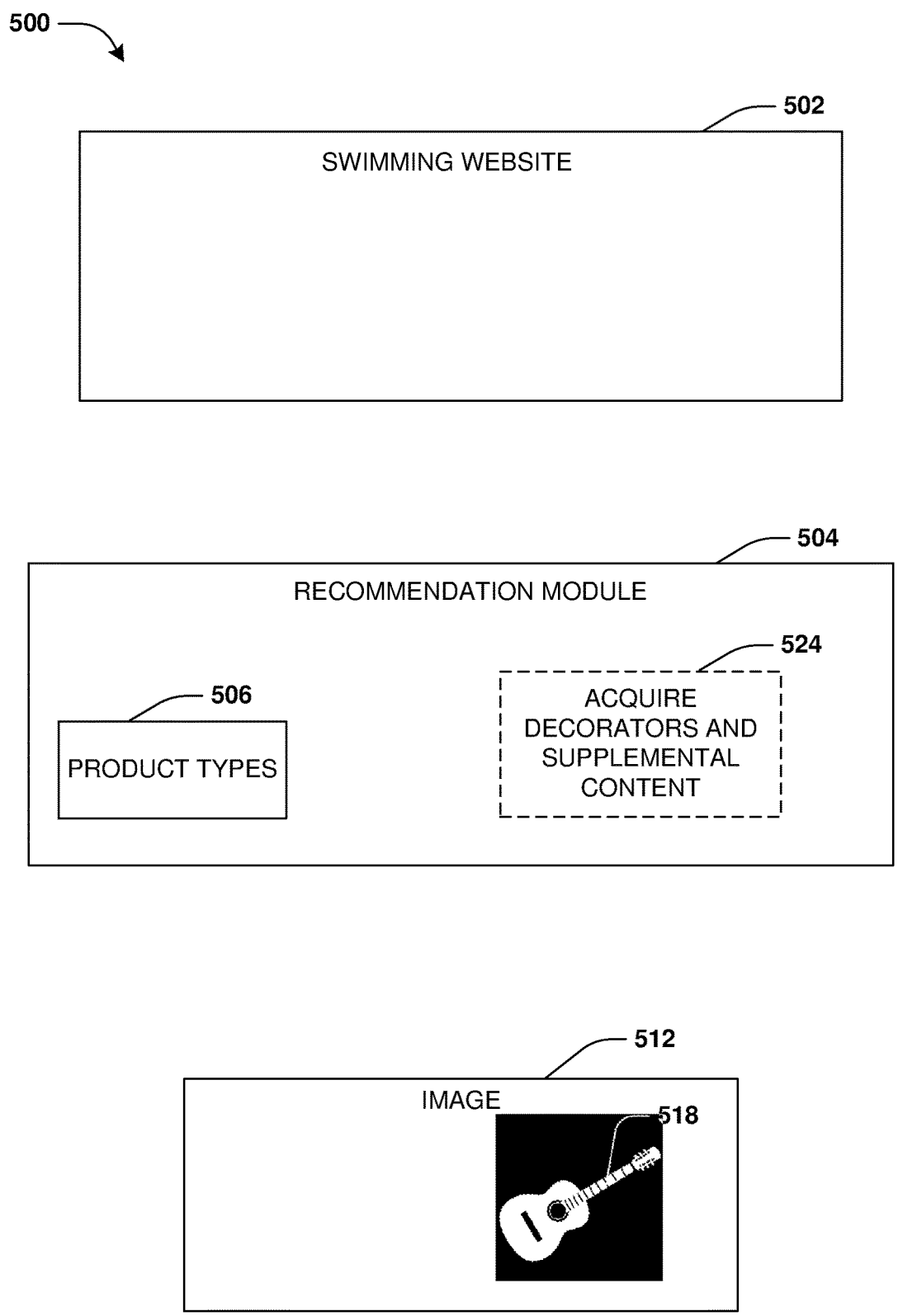
FIG. 5E is a component block diagram illustrating an example system for personalized banner generation and display, where decorators and supplemental content is acquired.

The product type may be used to select a new background and acquire 524 decorators and supplemental content to use for constructing a personalized banner to display to the user, at illustrated by FIG. 5E. In an embodiment, the new background is selected based upon a theme that can be manually assigned. In an embodiment of acquiring 524 supplemental content, a term frequency inverse document frequency algorithm is executed to calculate scores for a plurality of supplemental content (e.g., images, text, audio, a video, product pricing, available product quantity, product description, keywords about a product, and/or other content available from various content sources such as a repository of supplemental content, a website, a web service, etc.) based upon how much each supplemental content corresponds to a product title of the guitar product or other identifying information of the guitar product. In this way, one or more supplemental content items are selected based upon the one or more supplemental content items having scores above a threshold (e.g., highest scores). For example, the phrase "Axe Guitar!!" is acquired 524 from a website to use as supplemental content for generating the banner.

In an embodiment of acquiring decorators, one or more decorators are selected from a data source (e.g., a repository of decorators, a website, a web service, etc.) based upon the one or more decorators corresponding to the product type or other identifying information of the guitar product. For example, music note objects are acquired 524 from the data source to use as decorators for generating the banner. In an embodiment, the new background is selected based upon the product type of the guitar product, at 406. The new background may comprise shapes, patterns, drawings, colors, video, imagery, or other content that relates to the music product type.

Figure 5F:
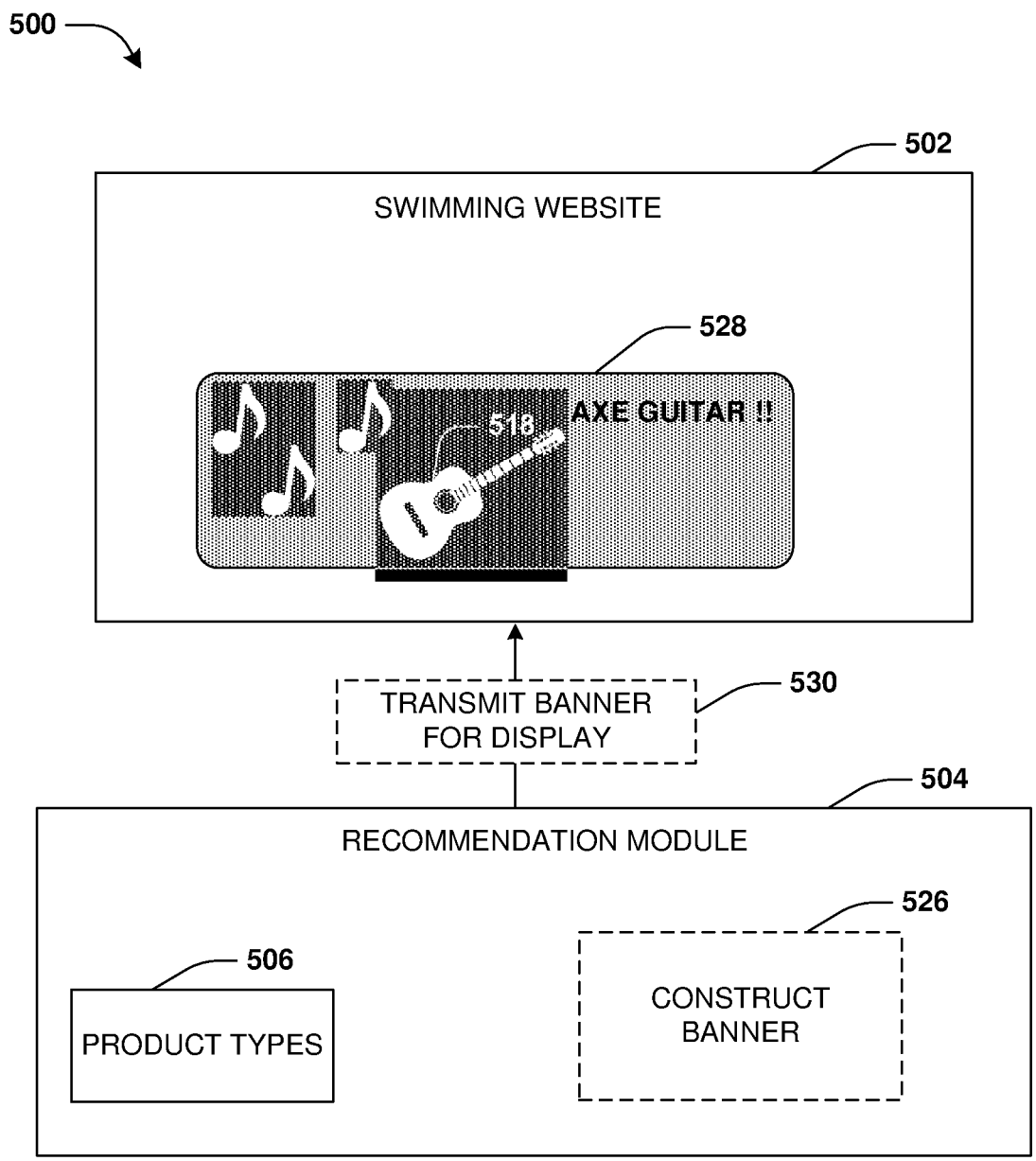
FIG. 5F is a component block diagram illustrating an example system for personalized banner generation and display, where a banner is generated and rendered on a display.

At 408, a banner 528 is constructed 526 using the new background, the guitar product object 518, and/or any decorators or supplemental content acquired for the banner 528, as illustrated by FIG. 5F. In an embodiment, a layout for the banner 528 is determined, such as sizes and locations of where the guitar product object 518, the decorators such as the music note objects, and/or the supplemental content such as the phrase "Axe Guitar!!" are to be inserted into the banner 528. The layout may be based upon a location of where the banner 528 will be displayed within the swimming website 502. The layout may be based upon prior user interaction with content, such as where the user previously interacted with banners having product objects positioned in the middle of banners and having an extra-large size and where the user previously ignoring banners having smaller sized product objects not positioned in the middle of banners. Thus, the guitar product object 518 may be placed in the middle of the banner 528, and a size of the guitar product object 518 may be increased. In this way, the user may be more likely to interact with the banner 528 because the layout of the banner 528 is personalized to the user. In an embodiment, the banner 528 is automatically sized and/or positioned within the swimming website 502 based upon user browsing behavior of the user (e.g., the user may generally not scroll down through websites, and thus the banner 528 may be positioned towards a top of the swimming website 502 so that the user will notice the banner 528; the user may generally ignore larger sized banners, and thus the banner 528 size may be decreased; etc.).

In an embodiment of constructing 526 the banner 528, a visual adjustment is applied to the banner 528, such as to adjust a saturation, a brightness, or other visual property (e.g., color, tone, size, etc.). The visual adjustment may be applied to the new background, the guitar product object 518, decorators, supplemental content, etc. In an example, a main color of the guitar product object 518 is detected. The main color is transferred from a red, green, blue (RGB) color space to a huge, saturation, value (HSV) color space. Complementary colors and/or analogous colors of the main color are identified using the HSV color space (e.g., complementary colors are within 180 degree difference of the main color and analogous colors are within 120 degree difference of the main color). The visual adjustment is applied to the banner 528 based upon the complementary colors and/or the analogous colors, such as by recoloring objects, decorators, supplemental content, and/or the new background based upon the colors.

The banner 528 is transmitted 530, such as over a network, to the computing device of the user for rendering through the swimming website 502 on a display of the computing device. In an embodiment, user interaction with the banner 528 through the swimming website 502 is monitored, such as whether the user clicks on the banner 528, quickly scrolls past the banner 528, scrolls to a position where the banner 528 is prominently displayed/viewable through the swimming website 502, etc. The recommendation module 504, such as the various machine learning techniques implemented by the recommendation module 504 to select the new background, generate the banner 528, apply a visual adjustment to the banner 528, select decorator objects or supplemental content, identify the product type, etc., is updated based upon the user interaction. For example, parameters and/or other logic of the recommendation module 504 may be adjusted based upon the user interaction (e.g., values of parameters used to create the banner 528 may be maintained or weighted higher based upon the user interacting with the banner 528 or the values may be changed or weighted lower based upon the user not interacting with the banner 528). In this way, the creation of personalized banners is improved.

Figure 6:
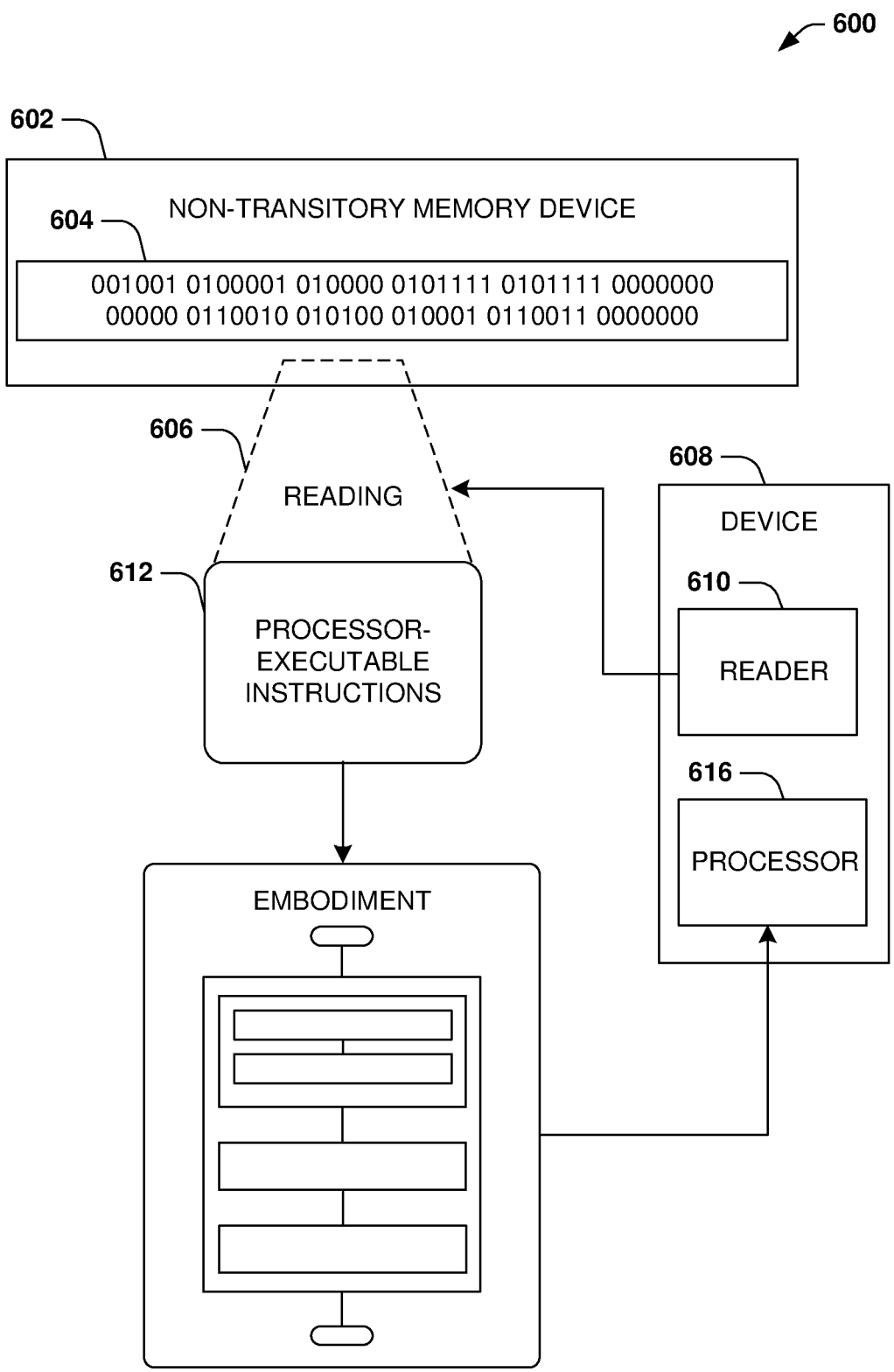
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
identifying an image comprising one or more objects;
distinguishing a first portion of the image corresponding to a product object of the one or more objects from a second portion of the image corresponding to a background, the background comprising at least one object, of the one or more objects, different than the product object;
removing the background of the image;
evaluating features of the product object to determine a product type of a product depicted by the product object;
selecting a new background based upon the product type; and
generating a banner comprising the new background and the product object positioned over the new background at a position within the banner.

2. The method of claim 1, wherein the distinguishing is performed via an execution of an unsupervised image segmentation process.

3. The method of claim 2, wherein the executing an unsupervised image segmentation process comprises:
detecting edges of objects depicted within the image; and
calculating areas of each object.

4. The method of claim 1, wherein the removing the background comprises:
assigning an average color of surrounding pixels to pixels of the background.

5. The method of claim 1, wherein the evaluating features of the product object comprises:
extracting the features of the product object; and
using the features to select the product type from a plurality of product types.

6. The method of claim 1, wherein the evaluating features of the product object comprises:
utilizing an image recognition net to process the image to determine the product type.

7. The method of claim 1, comprising:
selecting one or more decorator objects based upon the product type; and
inserting the one or more decorator objects into the banner.

8. The method of claim 7, comprising:
applying a visual adjustment to the banner, wherein the visual adjustment modifies at least one of a saturation, a brightness, or a visual property of the one or more decorator objects.

9. The method of claim 1, comprising:
applying a visual adjustment to the banner, wherein the visual adjustment modifies at least one of a saturation, a brightness, or a visual property of the new background.

10. The method of claim 1, comprising:
detecting a main color of the product object;
transferring the main color from a red, green, blue (RGB) color space to a hue, saturation, value (HSV) color space;
identifying complementary colors and analogous colors of the main color using the HSV color space; and
applying a visual adjustment to the banner based upon the complementary colors and the analogous colors.

11. A computing device comprising:
a processor; and
memory comprising processor-executable instructions that when executed by the processor cause performance of operations, the operations comprising:
identifying an image comprising one or more objects;
distinguishing a first portion of the image corresponding to a product object of the one or more objects from a second portion of the image corresponding to a background, the background comprising at least one object, of the one or more objects, different than the product object;
removing the background of the image;
evaluating features of the product object to determine a product type of a product depicted by the product object;
selecting a new background based upon the product type; and
generating a banner comprising the new background and the product object positioned over the new background at a position within the banner.

12. The computing device of claim 11, wherein the operations comprise:
acquiring supplemental content relating to the product; and
inserting the supplemental content into the banner.

13. The computing device of claim 12, wherein the operations comprise:
executing a term frequency inverse document frequency algorithm to calculate scores for a plurality of supplemental content based upon a correspondence of the plurality of supplemental content to a product title of the product; and
selecting the supplemental content from the plurality of supplemental content based upon a score of the supplemental content exceeding a threshold.

14. The computing device of claim 12, wherein the supplemental content comprises at least one of a product feature, a price, or keywords relating the product.

15. The computing device of claim 11, wherein the banner is generated by a recommendation model, and wherein the operations comprise:
monitoring user interaction with the banner; and
updating the recommendation model based upon the user interaction.

16. The computing device of claim 15, wherein one or more parameters of the recommendation model are updated based upon the user interaction, and wherein the one or more parameters are used to at least one of select the new background, generate the banner, apply a visual adjustment to the banner, or select decorator objects to include within the banner.

17. A non-transitory machine readable medium having stored thereon processor-executable instructions that when executed cause performance of operations, the operations comprising:
removing a background of an image comprising a product object depicting a product;
evaluating features of the product object to determine a product type of the product;
selecting a new background and one or more decorator objects based upon the product type; and
generating a banner comprising the new background and the product object positioned over the new background within the banner,
wherein at least one of:
the removing a background comprises:
executing an unsupervised image segmentation process to distinguish a first portion of the image as depicting the product from a second portion of the image as depicting the background,
wherein the executing an unsupervised image segmentation process comprises:
detecting edges of objects depicted within the image;
calculating areas of each object;
identifying the product object depicting the product based upon the product object having an area greater than other objects; and
removing objects other than the product object from the image;
the operations comprise:
detecting a main color of the product object;
transferring the main color from a red, green, blue (RGB) color space to a hue, saturation, value (HSV) color space;
identifying complementary colors and analogous colors of the main color using the HSV color space; and
applying a visual adjustment to the banner based upon the complementary colors and the analogous colors; or
the operations comprise:
executing a term frequency inverse document frequency algorithm to calculate scores for a plurality of supplemental content based upon a correspondence of the plurality of supplemental content to a product title of the product;
selecting supplemental content from the plurality of supplemental content based upon a score of the supplemental content exceeding a threshold; and
inserting the supplemental content into the banner.

18. The non-transitory machine readable medium of claim 17, wherein the operations comprise:
automatically performing at least one of a resizing or an auto-cropping of the banner based upon at least one of an attribute of a device or a user browsing behavior of a user utilizing the device to access a user interface.

19. The non-transitory machine readable medium of claim 17, wherein the operations comprise:
determining a layout for the product object and the one or more decorator objects within the banner based upon a location of the banner within a user interface.

20. The non-transitory machine readable medium of claim 17, wherein the operations comprise:
determining a layout for the product object and the one or more decorator objects within the banner based upon prior user interaction with content.

* * * * *